Figure 1:
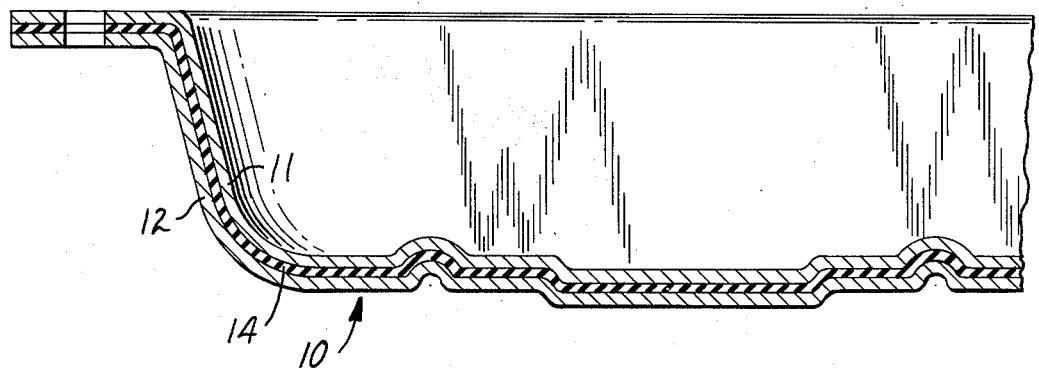

United States Patent [19]

Caldwell et al.

[11] 4,223,073
[45] Sep. 16, 1980

[54] HIGH-TEMPERATURE DAMPING COMPOSITE

[75] Inventors: Donald B. Caldwell, Lake Elmo; Thomas F. Gardeski, North St. Paul, both of Minn.

[73] Assignee: Minnesota Mining and Manufacturing Company, St. Paul, Minn.

[21] Appl. No.: 955,789

[22] Filed: Oct. 30, 1978

Related U.S. Application Data

[63] Continuation-in-part of Ser. No. 887,077, Mar. 15, 1978, abandoned.

[51] Int. Cl.² .................. B32B 15/06; B32B 15/08; F16F 15/04; F16F 15/12
[52] U.S. Cl. ........................ 428/422; 165/69; 165/84; 428/457; 428/461; 428/463
[58] Field of Search ................ 428/421–424, 428/457, 458, 461, 463, 909, 912; 165/69, 84

[56] References Cited

U.S. PATENT DOCUMENTS

| | | | |
|---|---|---|---|
| 3,007,679 | 11/1961 | Byerley et al. | 165/69 X |
| 3,087,565 | 4/1963 | Kerwin | 428/116 X |
| 3,147,314 | 9/1964 | Cluff | 260/837 |
| 3,271,188 | 9/1966 | Albert et al. | 428/463 |
| 3,399,103 | 8/1968 | Salyer et al. | 428/116 |
| 3,399,104 | 8/1968 | Ball et al. | 428/116 |
| 3,562,091 | 2/1971 | Oberst et al. | 428/463 X |
| 3,562,092 | 2/1971 | Oberst et al. | 428/463 X |
| 3,647,891 | 3/1972 | Loudas et al. | 260/633 |
| 3,733,349 | 5/1973 | Loudas et al. | 260/453 AL |
| 3,803,088 | 4/1974 | Gardeski | 528/219 |
| 4,032,089 | 6/1977 | Kinzler et al. | 244/123 |
| 4,082,141 | 4/1978 | Perretta | 165/69 |
| 4,126,742 | 11/1978 | Carleton et al. | 428/423 X |

Primary Examiner—Harold Ansher
Attorney, Agent, or Firm—Cruzan Alexander; Donald M. Sell; Robert E. Granrud

[57] ABSTRACT

Vibration-damping composite comprising one or more structural metal sheets having adhered thereto a viscoelastic polycyanurate polymer which effectively damps vibrations at elevated temperatures after prolonged exposure thereto. A preferred structural sheet is deadsoft aluminum-killed steel.

12 Claims, 2 Drawing Figures

U.S. Patent  Sep. 16, 1980  4,223,073

HIGH-TEMPERATURE DAMPING COMPOSITE

CROSS-REFERENCE TO RELATED APPLICATION

This application is a continuation-in-part of applicants' copending application Ser. No. 887,077, filed Mar. 15, 1978, now abandoned.

BACKGROUND TO THE INVENTION

During the past quarter century, the automotive industry has made great strides in reducing vibration, especially vibration which creates annoying noise levels. However, there is a need for a substantial reduction in the vibration of components which have high operating temperatures, especially vibration emanating from diesel engines. It has long been known that such vibrations could be substantially reduced by damping external surfaces of engine components and attachments such as the valve cover, the valley cover, mounting brackets and the oil pan, and that such vibrations could be substantially damped by forming such surfaces from a composite of a viscoelastic layer constrained by a pair of metal sheets. However, the automotive industry has not known a viscoelastic material which could effectively damp vibrations at the elevated operating temperatures while retaining such capability after prolonged exposure to the heat of the engine.

Typical of prior art concerning constrained-layer damping for automotive engines is "Diesel-Engine Noise Can Be Reduced", Automotive Engineering, Jan. 1973, pages 42–45, which suggests a deep oil pan made from double-skinned, damped sheet metal. As for free-layer damping, "Lowering Diesel Noise Through Hardware Modifications", Automotive Engineering, June 1973, pages 41–47, suggests butyl rubber $\frac{1}{4}$ inch thick bonded to the top of a standard valve cover. We have not found any publication dealing with constrained-layer damping of vibrations in automotive engines or other machines having high operating temperatures that identifies specific viscoelastic materials.

The same problem is involved in the need for damping vibrations at the surfaces of other machines or devices having high operating temperatures such as steam lines and high-voltage electrical transformers.

THE PRESENT INVENTION

The present invention provides what is believed to be the first vibration-damping composite which has good drawing quality, provides effective constrained-layer damping at high operating temperatures and retains that effectiveness after prolonged exposure to the high temperatures. More specifically, the present invention provides the first composite which can be drawn or otherwise formed to provide components of or facings for walls of machines in order to provide effective damping of vibrations in such machines during prolonged high temperature operation. By "prolonged high temperature operation" is meant operation at temperatures of at least 85° C. either continuously or intermittently for more than one year.

The novel composite may comprise at least one structural sheet of metal at least 0.2 mm in thickness and having good drawing quality, i.e., having an average plastic strain ratio $\bar{r}$ of at least 1.3 where $$\bar{r} = (r_L + 2r_{45} + r_T)/4$$

"L" and "T" indicating longitudinal and transverse directions and "45" indicating the directions for the plastic strain ratio r 45° to the longitudinal and transverse directions. Good drawing quality also requires that each metal sheet have a strain-hardening exponent n of at least 0.11 in the equation $$\bar{\sigma} = K\bar{\epsilon}^n$$

where $\bar{\sigma}$ is the true stress, K is a constant and $\bar{\epsilon}$ is the true strain. Preferably each metal sheet is of deep-drawing quality by virtue of $\bar{r}$ being about 1.5 or higher and n being about 0.2 or higher.

To permit the novel composite to be formed into engine components or the like without undue waste, it should be at least $\frac{1}{2}$ meter in both width and length. For some applications, the novel composite may be a laminate of at least two sheets of metal of good drawing quality and a viscoelastic layer adhered between adjacent sheets, which laminate can be deep drawn or otherwise formed into structural components such as a valve or transformer cover. It being well known that a laminate of two or more metal sheets will not draw as well as a single metal sheet of the same overall thickness, each such sheet desirably has the best available drawing quality and should remain unchanged in physical properties after being subjected to the temperature at which the laminate is created and also after prolonged exposure to operating temperatures. Aluminum-killed steel sheet is excellent in both its long-term resistance to heat and its drawability. For certain applications, the novel composite may include additional structural sheets other than metal, e.g., a fiber-reinforced plastic.

In its simplest form, the novel composite may comprise a single structural metal sheet and a layer of viscoelastic material which preferably is covered by a removable protective web to keep it clean. After removal of the protective web, the exposed viscoelastic layer can be bonded to the surface of a noise-producing wall such as an engine block or electrical transformer to provide a vibration-damping facing. Because such a wall may be sculptured, the composite preferably can be formed to the contour of the underlying object before being applied thereto.

While the composite of the present invention is primarily useful for reducing noise, it also has value for damping sub-audible vibrations. The damping of either audible or sub-audible vibrations extends the fatigue life of the article being damped.

The viscoelastic material of the novel composite is a polycyanurate polymer comprising the repeating unit

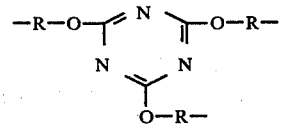

Each R is the residue after removal of the hydroxy from one of (a) HO—Ar—OH

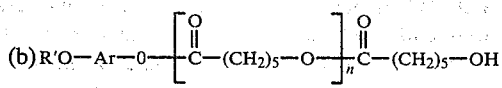

(c) HOCH$_2$+[(CF$_2$CH$_2$)$_j$(CF$_2$CFX)$_k$]$_m$ CH$_2$OH or (d) HO—CH$_2$CF$_2$(CF$_2$)$_h$CF$_2$CH$_2$OH wherein h is 0 or an integer of 1 to 6, j and k are integers whose ratio j/k is 1/1 to 10/1, m is an integer of 1 to 100, n is an integer of 1 to 20, X is fluorine or perfluoroalkyl, —Ar— represents

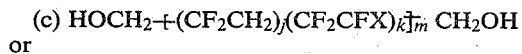

wherein Z represents —S—, —SO$_2$—, —O—;

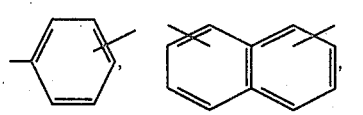

wherein R$_1$ and R$_2$ represent hydrogen, lower alkyl or

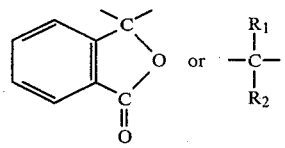

wherein ω is an integer from 2 to 6.

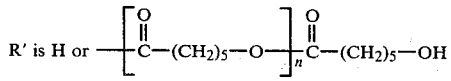

Up to 50 percent of the R groups of the polycyanurate polymer may be substituted by monofunctional equivalents of any of the hydroxyl-terminated compounds.

One or more of the hydroxyl-terminated compounds are first converted to a cyanate-terminated prepolymer or prepolymers, e.g., by reaction with cyanogen chloride or bromide. The prepolymers are cured by heating, if desired with a catalyst, through the cyclotrimerization of cyanate groups to produce the polycyanurate polymer. In the presence of catalysts such as Lewis acids, the crosslinking may be carried out at lower temperatures.

The polycyanurate polymer has sufficient crosslinks such that its cyanurate nitrogen comprises 0.5 to 2 percent of its total weight when the polymer comprises 60 percent fluorine and 1.0 to 3.5 percent of its total weight when it is free from fluorine. At fluorine levels below 60 percent, the desired ranges of cyanurate nitrogen levels are proportionally intermediate those stated levels. All of the R's may be the residue of either a polyester (b) or a fluoropolymer (c), but the nitrogen would inherently exceed the aforementioned levels if one attempted to employ only a diphenol (a) and/or a fluorochemical (d). When the nitrogen level exceeds the aforementioned ranges, the polymer tends to be unduly stiff and rigid; and when it is below those ranges, the polymer tends to be too soft to exhibit good vibration damping characteristics. Within the aforementioned ranges of nitrogen levels, an unsupported layer of the polycyanurate polymer can be expected to provide a loss factor of at least 0.5 at temperatures between 80° and 100° C. after exposure for hundreds of hours within that temperature range.

The polycyanurate polymer may be made as in U.S. Pat. No. 3,803,088 (Gardeski) starting with a polyester (b) and optionally also HO—Ar—OH; starting with a fluoropolymer (c) such as a fluoropolymer of U.S. Pat. No. 3,647,891 (Loudas et al.) and optionally also HO—Ar—OH; or U.S. Pat. No. 3,733,349 (Loudas et al.) starting with a fluorochemical (d), but if made with (d) alone, the polycyanurate polymer would have a high nitrogen content and would be too stiff and rigid for utility in the present invention.

Where low cost is of utmost importance, it is preferred to start with only a diphenol (a) and polyester (b) to produce a polycyanurate polymer that can be expected to maintain good damping properties for at least 1000 hours at high temperatures. For applications entailing prolonged exposure to even higher temperatures, it is preferred that the polycyanurate polymer comprise at least 35% by weight fluorine. To this end, a fluoropolymer (c) is a preferred starting material.

In preparing the polyester (b), epsilon-caprolactone is preferred, being available in good quantity at reasonable cost. Bisphenol A [2,2-bis(4-hydroxyphenyl)-propane] is a preferred diphenol (a). When starting with a fluoropolymer (c) wherein m exceeds 25, it is preferred also to employ a diphenol (a) in order to keep the nitrogen content of the polycyanurate polymer above 0.5%.

The bond between each structural sheet and adjacent viscoelastic layer of the novel composite should exceed the cohesive strength of the viscoelastic layer. Normally this is realized by curing a cyanate-terminated prepolymer or prepolymers in contact with a thoroughly clean structural sheet. However, when curing the prepolymers between two structural sheets, large voids tend to develop, apparently due to volatiles. Because efforts to eliminate volatiles have been only partially successful, it is presently preferred to cure the prepolymers in contact with only one structural sheet and then to use a high-modulus adhesive to bond the exposed face of the polycyanurate polymer either to a second structural sheet or to the viscoelastic layer of an identically prepared sheet. The adhesive should be very thin, e.g., 20–40 micrometers.

For most applications, there should be at least 20 micrometers in thickness of viscoelastic polycyanurate polymer in each constrained-damping layer in order to provide significant damping. Thicknesses of the polycyanurate polymer up to about 250 micrometers show no evidence of sagging or running. For greater thicknesses or for uses wherein the viscoelastic polycyanurate layer may be subjected to substantial compressive forces, it is preferred to lay a scrim of polyester fibers over the structural surface before applying the prepolymers.

When a laminate of two metal sheets and a central viscoelastic layer is deep-drawn, the outer metal sheet is elongated at areas being bent. This subjects the viscoelastic layer to severe strain. Certain of the polycyanurate polymers can be expected to have an elongation in tension of 80–110% which generally is sufficient to avoid significant rupture during deep-drawing. Higher elongation is normally attainable by keeping the nitrogen content of the polycyanurate polymer at the lower ends of the aforementioned ranges.

THE DRAWING

Figure 2:
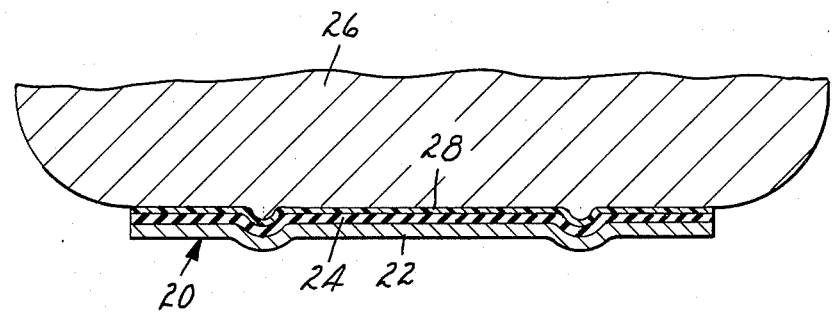

In the drawing:

FIG. 1 is a fragmentary schematic cross-section showing a composite of the present invention which has been deep-drawn, and FIG. 2 is a fragmentary schematic cross-section showing another composite applied to damp vibrations in an engine block.

The composite 10 fragmentarily shown in FIG. 1 consists of two deep-drawable metal sheets 11 and 12 and a central viscoelastic layer 14. In forming the illustrated bend, the outer metal sheet 12 has been substantially elongated, as has that portion of the viscoelastic layer 14 adjacent thereto. The viscoelastic layer has both sufficient adhesion to the metal sheets and sufficient cohesion to maintain its integrity as shown in spite of the stresses to which it is subjected in the illustrated degree of bending.

The composite 20 fragmentarily shown in FIG. 2 consists of a single metal sheet 22 and a viscoelastic layer 24 which has been adhered to the face of an engine block 26 by a cured layer 28 of a thermosetting resin. Before being adhered to the engine block 26, the composite 20 has been formed to match the face of the block.

Cyanate A

Bisphenol A and ε-caprolactone were inter-reacted at a 1:2 mole ratio as disclosed in Example 1 of U.S. Pat. No. 3,803,088 and then reacted with cyanogen chloride as described in Example 2 of that patent to provide a cyanate prepolymer (here called "Cyanate A"). Upon heating Cyanate A, a cyanurate polymer was obtained having the following properties:

| | |
|---|---|
| Tensile strength (ASTM D-412-68) | 2500 psi (17250 kN/m$^2$) |
| Elongation at break | 90–110% |
| Izod impact, ft. lbs. per inch (ASTM D-256-56) | 4.0 (50 J/m) |
| Hardness, Shore D | 56 |
| Hardness change after 250 hours at 204° C. | +4 |
| Weight loss after 250 hours at 204° C. | 4% |
| after 1500 hours at 177° C. | 4% |
| Specific gravity | 1.19 |
| Loss tangent at 1000 Hz, 80° C. | 0.73 |
| 100° C. | 0.63 |
| Storage modulus, G', dynes/cm$^2$ at 1000 Hz, 80° C. | 5.6 × 10$^7$ |
| 100° C. | 2.2 × 10$^7$ |

EXAMPLE 1

Used to make a laminate was dead-soft aluminum-killed steel sheet having

| | |
|---|---|
| Thickness | 0.46 mm |
| Tensile strength (ASTM D-412) | 49,300 psi (340,000 kN/m$^2$) |
| Yield strength | 29,100 psi (201,000 kN/m$^2$) |
| Hardness, Rockwell B | 15T77 |
| Average plastic strain ratio $\bar{r}$ | 1.59 |
| Strain-hardening exponent n | 0.23 |

The steel sheet was vapor degreased, then scrubbed with an abrasive scouring pad and finally subjected to a glow discharge treatment, immediately followed by application of a 45% solids solution of Cyanate A in methyl ethyl ketone. To the solution had been added 0.25% by weight of a fluoroaliphatic polyester wetting agent. This was sprayed onto two panels of the steel sheet and dried in an oven for a few minutes at 66° C. followed by two hours at 190° C. to cure the Cyanate A to provide a viscoelastic layer of polycyanurate polymer on each panel having a dried thickness of about 0.065 mm.

After cooling, a structural epoxy resin adhesive was hand-coated over both viscoelastic layers and placed face-to-face in a heated press for about 12 minutes at 154° C. to cure the epoxy resin. The thickness of the laminate was controlled by 1.09-mm shims so that the thickness of the cured epoxy layer was theoretically about 0.04 mm, the uncured composition having been applied in excess and allowed to squeeze out in the press.

The laminate was deep-drawn to provide valve covers for diesel engines having a cross-section as shown in FIG. 1 of the drawing without significant delaminating or rupturing of the viscoelastic polycyanurate layer. One of the valve covers was suspended on fine wires in an air-circulating oven and tested first at room temperature and successively at each temperature indicated in the table below after being held at that temperature for 30 minutes. In the test, the valve cover was excited by a magnetic transducer, and the loss factor was measured at the frequency of major resonant response. The values indicate good vibration damping at temperatures to which the valve cover would be heated in a typical diesel engine.

| Temperature °C. | Major Resonant Freq. in Hz. | Composite Loss Factor |
|---|---|---|
| Room Temp. | 536 | .02 |
| 63 | 474 | .12 |
| 92 | 363 | .20 |
| 107 | 341 | .14 |
| 113 | 338 | .11 |

Another valve cover was held in an oven at 150° C. for 500 hours without visible effect upon the valve cover or its viscoelastic layer.

Specimens of the laminate of this Example which were specially prepared for overlap shear testing exhibited the following values:

| Testing Temperature | Overlap shear strength (psi) |
|---|---|
| Room Temp. | 1027 (7090 kN/m$^2$) |

| Testing Temperature | Overlap shear strength (psi) |
|---|---|
| 65° C. | 407 (2810 kN/m²) |
| 120° C. | 170 (1170 kN/m²) |

We claim:

1. A composite at least ½ meter in both width and length of a structural metal sheet and a viscoelastic layer, which composite can be formed to provide components of or facings for machines in order to provide effective damping of vibrations in such machines during prolonged high-temperature operation, said metal sheet having an average plastic strain ratio r̄ of at least 1.3, a strain-hardening exponent n of at least 0.11 in the equation $$\bar{\sigma} = K\bar{\epsilon}^n$$

where $\bar{\sigma}$ is the true stress, K is a constant and $\epsilon$ is the true strain, and a thickness of at least 0.2 mm, and said viscoelastic layer having a thickness of at least 20 micrometers and being a cured polycyanurate polymer comprising the repeating unit

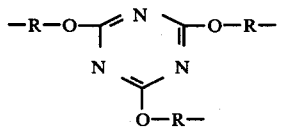

wherein each R is the residue after removal of the hydroxyl radicals from one of (a) HO—Ar—OH (b)

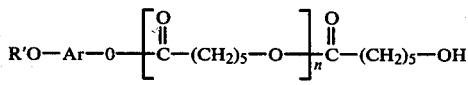

(c) HOCH₂—(CH₂CH₂)ⱼ(CF₂CFX)ₖ]ₘ CH₂OH (d) HO—[CH₂CF₂(CF₂)ₕCF₂CH₂OH wherein h is 0 or an integer of 1 to 6, j and k are integers whose ratio j/k is 1/1 to 10/1, m is an integer of 1 to 100, n is an integer of 1 to 20, X is fluorine or perfluoroalkyl, —Ar—represents

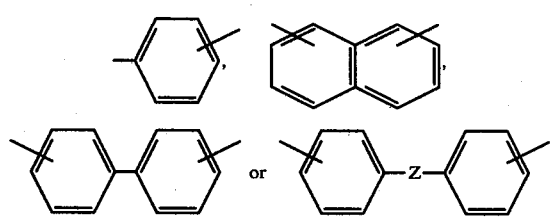

wherein Z represents —S—, —SO₂—, —O—,

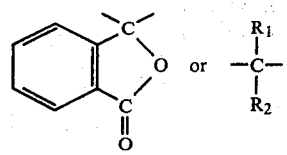

wherein $R_1$ and $R_2$ represent hydrogen, lower alkyl or

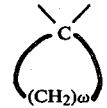

wherein ω is an integer from 2 to 6,

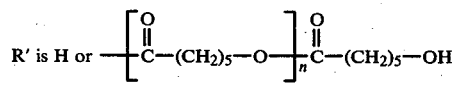

and the polycyanurate polymer has sufficient crosslinks such that its cyanurate nitrogen comprises 0.5 to 2% of its total weight when the polymer comprises 60% fluorine and 1.0 to 3.5% of its total weight when it is free from fluorine.

2. In a composite as defined in claim 1, the further improvement comprising: the cured polycyanurate polymer further comprises repeating units such that up to 50% of the R groups are residues of monofunctional equivalents of the hydroxyl-terminated compounds.

3. In a composite as defined in claim 1, the further improvement comprising: the R groups are primarily derived from epsilon-caprolactone.

4. In a composite as defined in claim 3, the further improvement comprising: an appreciable proportion of the R groups are derived from a diphenol.

5. In a composite as defined in claim 4, the further improvement comprising: the diphenol is Bisphenol A.

6. In a composite as defined in claim 1, the further improvement comprising: said drawable sheet is aluminum-killed steel.

7. In a composite as defined in claim 1, the further improvement comprising: said viscoelastic layer is adhered to the drawable sheet by a thermoset resin.

8. In a composite as defined in claim 1, the further improvement comprising: said composite is a laminate comprising two sheets of sheet metal of good drawing quality and a central viscoelastic layer.

9. In a composite as defined in claim 8, the further improvement comprising: said viscoelastic layer is adhered directly to one of said metal sheets and a thermoset resin adheres it to the other metal sheet.

10. In a composite as defined in claim 8, the further improvement comprising: said viscoelastic layer incorporates a central layer of thermoset resin.

11. A shaped article formed from a laminate as defined in claim 8.

12. A machine having a contoured wall to which is bonded said viscoelastic layer of the composite defined in claim 1.

* * * * *

UNITED STATES PATENT AND TRADEMARK OFFICE
CERTIFICATE OF CORRECTION

PATENT NO. : 4,223,073
DATED : September 16, 1980
INVENTOR(S) : Donald B. Caldwell and Thomas F. Gardeski It is certified that error appears in the above—identified patent and that said Letters Patent is hereby corrected as shown below:

At column 7, line 21 "$\dot{\epsilon}$" should read --$\bar{\epsilon}$--.

Column 7, lines 45 and 46 should read
--(c) $HOCH_2[(CF_2CH_2)_j(CF_2CFX)_k]_m CH_2OH$
(d) $HO-CH_2CF_2(CF_2)_h CF_2CH_2OH$--.

Signed and Sealed this

Seventeenth Day of November 1981

[SEAL]

Attest:

GERALD J. MOSSINGHOFF

Attesting Officer

Commissioner of Patents and Trademarks